May 16, 1939.   H. J. HORN   2,158,126
WHEEL ORNAMENT
Filed Feb. 23, 1937

INVENTOR.
HARRY J. HORN
BY
Carroll R. Taber
ATTORNEY.

Patented May 16, 1939

2,158,126

UNITED STATES PATENT OFFICE 2,158,126

WHEEL ORNAMENT

Harry J. Horn, Lansing, Mich., assignor to Motor Wheel Corporation, Lansing, Mich., a corporation of Michigan Application February 23, 1937, Serial No. 126,967

4 Claims. (Cl. 301—37)

This invention relates to vehicle wheels, and more particularly to a novel method of attaching an ornamental annulus thereto.

The principal object of the present invention is the provision of an ornamental annulus so formed as to be held in position on the wheel by a hub cap when the hub cap is in place, and to be held in position on the wheel by the hub cap attaching clips when the hub cap is removed. Another object of the invention is to so form the annulus that it may be readily removed or installed upon the wheel while at the same time precluding accidental dislodgment of the annulus after it has been installed upon the wheel.

An illustrative embodiment of the invention is shown in the accompanying drawing, wherein—

Figure 1:
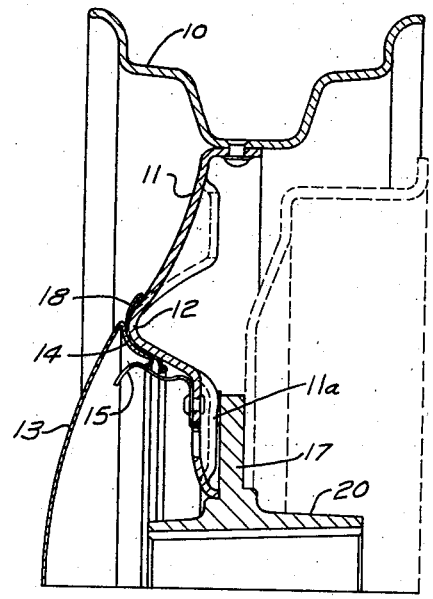
Figure 1 is a fragmentary radial section of a wheel embodying the present invention.

The wheel shown in Figure 1 includes a conventional tire retaining rim 10 secured to the periphery of a wheel body 11. The wheel body is formed with a recessed central bolting on flange 11a secured to the flange 17 of a hub 20 by securing bolts, not shown. Intermediate its bolting on flange and its periphery, the wheel body 11 is formed with an annular crown or bead 12. There may also be secured to the hub flange 17 a conventional form of brake drum, as shown in dotted lines in Figure 1.

A hub cap 13 having a peripheral flange portion 14 is arranged in position to conceal the bolting on flange 11a. The peripheral portion 14 of the hub cap is formed of a configuration corresponding to that of the crown or bead portion 12 of wheel body 11.

The hub cap 13 is detachably secured to the wheel by means of a plurality of resilient attaching clips 15. The attaching clips 15 each have their inner extremity rigidly secured to the bolting on flange 11a by rivets 16. The free extremities of the attaching clips are of gooseneck formation and are located closely adjacent the crown 12 of wheel body 11.

As shown in Figure 1, the free extremities of the attaching clips 15 are adapted to resiliently engage the inner edge of the peripheral portion 14 of the hub cap when the hub cap is pressed axially toward the wheel. The inner edge of the peripheral portion 14 of the hub cap 13 is of a diameter somewhat less than the diameter of a circle passing through the radially outermost portions of the attaching clips 15, but of a sufficiently large diameter to permit pressing the said edge over the radially outermost portion of the attaching clips.

Figure 2:
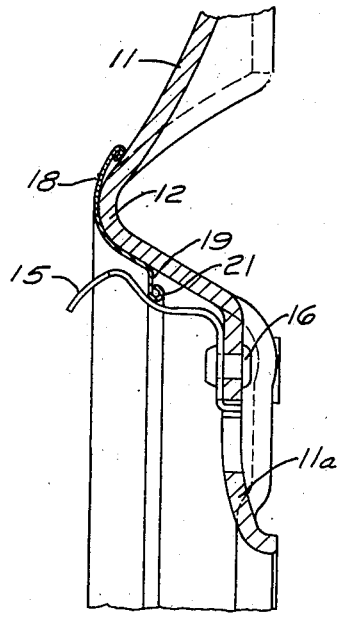
Figure 2 is an enlarged fragmentary sectional view of the wheel illustrated in Figure 1, but showing the relation of the parts when the hub cap is removed.

As shown in Figures 1 and 2, an ornamental annulus 18 engages the bead 12 of wheel body 11, and has a radially extending inner periphery 19 which is beaded as indicated at 21. The ornamental annulus 18 is here shown in the form of a trim ring of limited radial extent. It may, however, take the form of a full cover extending outwardly to a position adjacent the rim 10.

The inner periphery of annulus 18 is of a diameter sufficiently less than the diameter of a circle passing through the radially outermost portions of the attaching clips 15 to prevent the removal of the annulus from the position shown in Figures 1 and 2. In order to provide for the removal of the annulus, the inner periphery thereof is formed with a plurality of spaced relief zones indicated at 22 in Figure 3. The number, size and spacing of these relief zones correspond to the number, size and spacing of the attaching clips 15. When the annulus 18 is rotated to a position bringing the relief zones 22 into alignment with the attaching clips 15, the annulus may be freely removed from the wheel without interference from the attaching clip 15.

Figure 3:
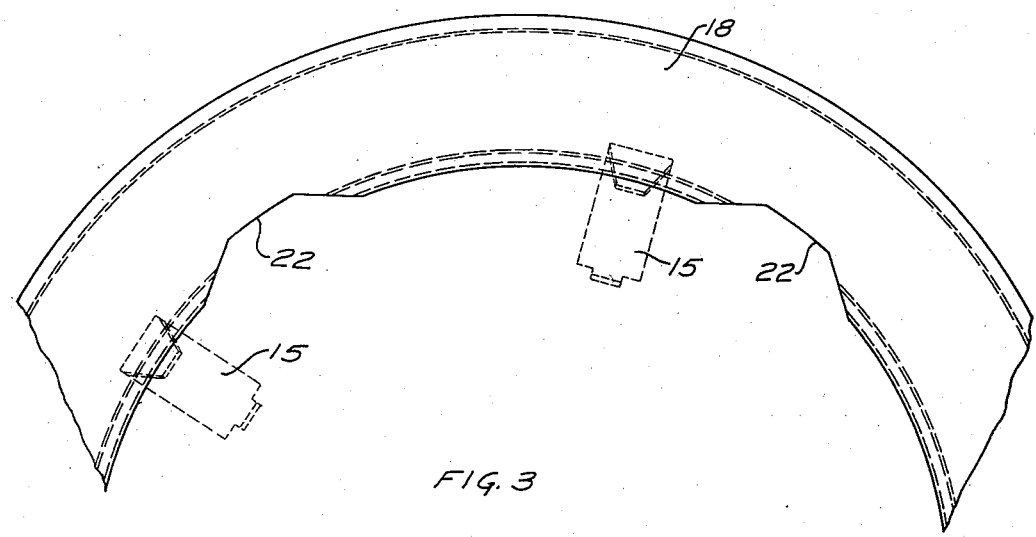
Figure 3 is a fragmentary elevational view of the ornamental annulus showing its relation to the hub cap attaching clips.

The normal position of the annulus 18, when installed upon the wheel as shown in Figures 1 and 2, is shown in Figure 3. As there shown, the relief zones 22 are circumferentially spaced from the corresponding attaching clips 15.

The invention is best realized when the bead 12 of the wheel body, the adjacent portion of the ornamental annulus 18 and the peripheral portion 14 of the hub cap 13 are all of a corresponding configuration, as shown in Figure 1.

When the hub cap 13 is installed upon the wheel the ornamental annulus 18 is held in position by the peripheral portion 14 of the hub cap, the hub cap in turn being held in position by the attaching clips 15. When the hub cap 13 has been removed, as shown in Figure 2, the ornamental annulus 18 is held in position by the attaching clips 15.

While only a single illustrative embodiment of the invention has been herein shown and described, it will be readily understood that the invention is adapted for other embodiments without departing from the spirit of the appended claims.

I claim:

1. A vehicle wheel including, in combination, a wheel body, a plurality of resilient attaching clips each having one end rigidly attached to the wheel body and a main body portion arranged in adjacent relation to the wheel body, and an ornamental annulus encircling the attaching clips and being positioned between the attaching clips and the wheel body, the normal inner periphery of the annulus being of a diameter sufficiently less than the diameter of a circle passing through the radially outermost portions of the attaching clips to prevent the removal of the ornamental annulus from its position between the attaching clips and the wheel body but of greater diameter than the diameter of a circle passing through the radially innermost portions of said main body portions, the said inner periphery being provided with a plurality of relief zones corresponding in spacing and number to the attaching clips to provide for the free removal of the annulus from its position between the clips and the wheel body when the relief zones are aligned with the attaching clips.

2. A vehicle wheel including, in combination, a wheel body, a hub cap, a plurality of resilient attaching clips each having one end rigidly attached to the wheel body and a main body portion resiliently engaging the hub cap, and an ornamental annulus encircling the attaching clips and being positioned between the hub cap and the wheel body, the normal inner periphery of the ornamental annulus being of a diameter sufficiently less than the diameter of a circle passing through the radially outermost portions of the attaching clips to prevent the removal of the ornamental annulus but of greater diameter than the diameter of a circle passing through the radially innermost portions of said main body portions, the said inner periphery being provided with a plurality of relief zones corresponding in spacing and number to the attaching clips to provide for the free removal of the annulus when the relief zones are aligned with the attaching clips and the hub cap has been disengaged from the attaching clips.

3. A vehicle wheel including, in combination, a wheel body, a plurality of resilient attaching clips each having one end rigidly attached to the wheel body and a main body portion arranged in adjacent relation to the wheel body, an ornamental annulus encircling the attaching clips, the portions of the wheel body and of the ornamental annulus adjacent said attaching clips being of corresponding configuration whereby the attaching clips press the ornamental annulus into intimate engagement with the wheel body, the normal inner periphery of the annulus being sufficiently less than the diameter of a circle passing through the radially outermost portions of the attaching clips to prevent the removal of the ornamental annulus but of greater diameter than the diameter of a circle passing through the radially innermost portions of said main body portions, the said inner periphery of the annulus being provided with a plurality of relief zones corresponding in number and spacing to the attaching clips to provide for the free removal of the annulus when the relief zones are aligned with the attaching clips.

4. A vehicle wheel including, in combination, a wheel body, a hub cap having a peripheral portion formed with a configuration corresponding to an adjacent portion of the wheel body, a plurality of resilient attaching clips each having one end rigidly attached to the wheel body and a main body portion resiliently engaging said peripheral portion of the hub cap to detachably hold it adjacent the wheel body, and an ornamental annulus encircling the attaching clips and including a portion being positioned between the peripheral portion of the hub cap and the wheel body, the last mentioned portion of the ornamental annulus being of a configuration corresponding to that of the adjacent portions of the wheel body and hub cap, the normal inner periphery of the annulus being of a diameter sufficiently less than the diameter of a circle passing through the radially outermost portions of the attaching clips to prevent the removal of the annulus but of greater diameter than the diameter of a circle passing through the radially innermost portions of said main body portions, the said inner periphery of the annulus being provided with a plurality of relief zones corresponding in number and spacing to the attaching clips to provide for the free removal of the annulus when the relief zones are aligned with the attaching clips and the hub cap has been disengaged from the attaching clips.

HARRY J. HORN.